United States Patent [19]

Wada

[11] 4,164,691
[45] Aug. 14, 1979

[54] MULTIPHASE BRUSHLESS DC MOTOR USING TWO HALL-EFFECT GENERATORS

[75] Inventor: Kinzo Wada, Yokohama, Japan

[73] Assignee: Victor Company of Japan, Limited, Japan

[21] Appl. No.: 882,084

[22] Filed: Mar. 1, 1978

[30] Foreign Application Priority Data

Mar. 3, 1977 [JP] Japan .................................. 52-23109
May 19, 1977 [JP] Japan .................................. 52-57917

[51] Int. Cl.$^2$ .......................................... H02K 29/00
[52] U.S. Cl. ................................................... 318/254
[58] Field of Search ........................ 318/138, 254, 696

[56] References Cited

U.S. PATENT DOCUMENTS

| | | | |
|---|---|---|---|
| 3,652,909 | 3/1972 | Rainer et al. | 318/254 A |
| 3,887,844 | 6/1975 | Yoshida | 318/254 A X |
| 3,938,014 | 2/1976 | Nakajima | 318/254 A X |
| 4,028,598 | 6/1977 | Bergmans | 318/254 A X |

*Primary Examiner*—Gene Z. Rubinson
*Attorney, Agent, or Firm*—Robert E. Burns; Emmanuel J. Lobato; Bruce L. Adams

[57] ABSTRACT

In a multiphase brushless DC motor having a permanent magnet rotor, a plurality of stator windings and a pair of Hall-effect generators acting as electromagnetic sensors, the stator windings are successively energized by currents supplied from a respective one of a plurality of power transistors which are responsive to the conduction of a respective one of a plurality of switching transistors. The switching transistors are connected in pairs to form first and second differential amplifiers. The latter responds to the potential at the Hall voltage electrode of the respective Hall-effect generator relative to a potential at the junction point of the differential amplifier configuration.

2 Claims, 5 Drawing Figures

MULTIPHASE BRUSHLESS DC MOTOR USING TWO HALL-EFFECT GENERATORS

BACKGROUND OF THE INVENTION

The present invention relates to multiphase brushless DC motors using two Hall-effect generators.

In a prior art four-phase brushless DC motor using two Hall-effect generators electrically mutually displaced by 90°, the four stator windings are supplied with currents provided by a respective one of four power transistors each being controlled in response to the switching of a respective one of a plurality of switching transistors. The switching transistors have their emitter electrodes connected in common to form a single differential amplifier and their base electrodes connected to the voltage electrodes of the Hall-effect generators so that the switching time of each switching transistor is determined by the relative Hall voltages of the Hall-effect generators. However, the Hall voltage generated in response to the variation of magnetic fields contains DC voltage components of amplitudes differing between Hall-effect generators because of their nonuniform operating characteristics. Furthermore, the DC voltage components tend to vary as a function of time and other influencing factors so that the result is a variation of the relative amplitudes of the potential at the base electrodes of the switching transistors. As a result, the switching time and therefore commutation internal of each winding may vary as a function of the DC component and hence the operating performance of the Hall-effect generators. This problem will be severe when the waveform of the Hall voltages is a pulse-like shape rather than sinusoidal.

SUMMARY OF THE INVENTION

The primary object of the invention is to eliminate the prior art disadvantages by connecting the switching transistors in pairs so as to form first and second separate differential amplifiers. The switching transistors of each differential amplifier configuration are individually switched into conduction solely in response to the Hall voltage relative to the DC voltage component rather than relative to the voltage developed in the switching transistors of the other differential amplifier configuration.

The current supplied to the first different amplifier is controlled by a first current control transistor in response to a control signal in order to vary the currents supplied to the first and third windings, and the current supplied to the second differential amplifier is controlled by a second current control transistor in response to the control signal in order to vary the currents supplied to the second and fourth windings.

BRIEF DESCRIPTION OF THE DRAWINGS

The invention is further described in detail with reference to the accompanying drawings, in which.

DETAILED DESCRIPTION

Figure 1:
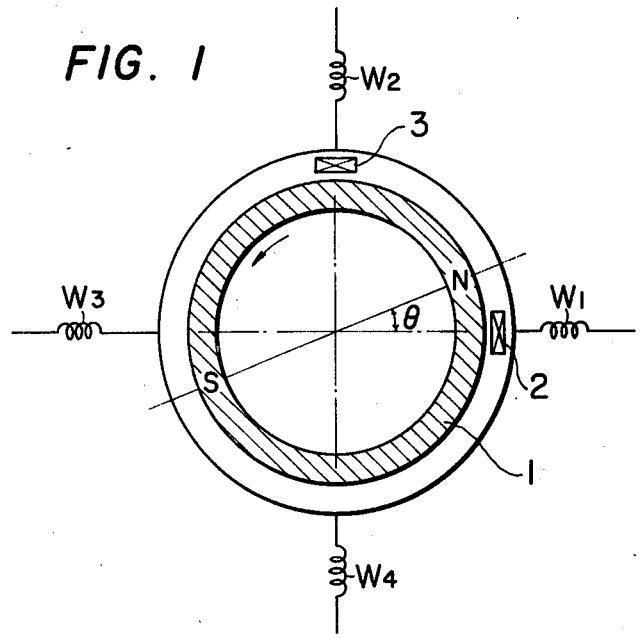
FIG. 1 is a schematic illustration of a four-phase brushless DC motor useful for describing the operation of the prior art and the present invention.
Figure 2:
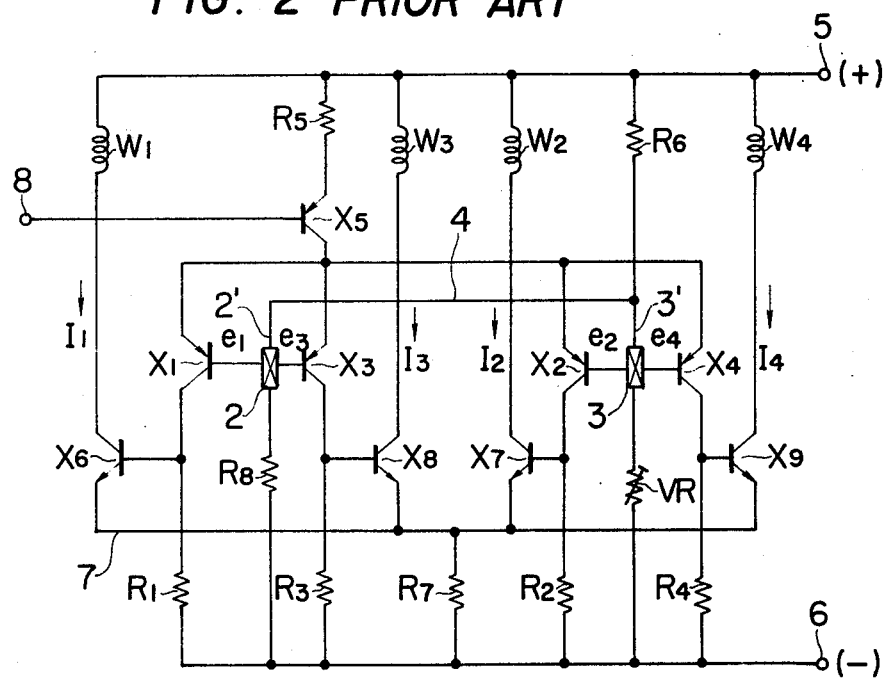
FIG. 2 is a circuit diagram of the prior art motor control circuit.

The present invention is concerned with a circuit for operating a brushless DC motor having a configuration as shown in FIG. 1. This motor is shown as comprised of a permanent magnet rotor 1, four stator windings W1 through W4 angularly spaced at electrical displacement of 90° from each other, and Hall-effect generators 2 and 3 affixed to the stator 1 adjacent to the windings W1 and W2, respectively. The rotor 1 is shown to rotate in the counterclockwise direction as indicated by the arrow and the displacement angle $\theta$ is measured from a reference point corresponding to the line connecting the windings W1 and W3. Before going into the details of the present invention, reference is first had to FIG. 2 in which a prior art operating circuit is illustrated. In FIG. 2 Hall-effect generators 2 and 3 have their current supply electrodes 2 and 3 connected together by a connection 4 and thence to a positive polarity terminal 5 via a resistor R6, with their opposite current supply electrodes connected to the negative polarity terminal 6 via resistor R8 and variable resistor VR, respectively. PNP transistors X1 and X2 are provided having their base electrodes connected to the left-side Hall voltage electrodes of the Hall-effect generators 2 and 3 and their emitters connected together to the collector of transistor X5 and their collectors connected to the negative terminal 6 via resistors R1 and R2, respectively. Likewise, PNP transistors X3 and X4 are provided having their base electrodes connected to the right-side Hall voltage electrodes of the Hall-effect generators 2 and 3 and their emitters connected together to the collector of transistor X5, and their collectors connected to the negative terminal 6 via resistors R3 and R4, respectively. NPN power transistors X6, X7, X8 and X9 are provided to energize windings W1 to W4, respectively, by currents I1 through I4 in response to the potential at the collectors of transistors X1 through X4, respectively. The emitters of the power transistors X6 to X9 are all connected together by a connection 7 and thence to the negative terminal 6 via resistor R7. The base electrode of transistor X5 is connected to a current control terminal 8 and its emitter is connected to the positive terminal 5 via resistor R5. The voltage at terminal 8 is supplied with a control signal which varies the current passing through the transistor X5, which in turn varies the currents supplied to the transistors X1 through X4, and therefore currents supplied to the windings W1 through W4.

Figure 5:
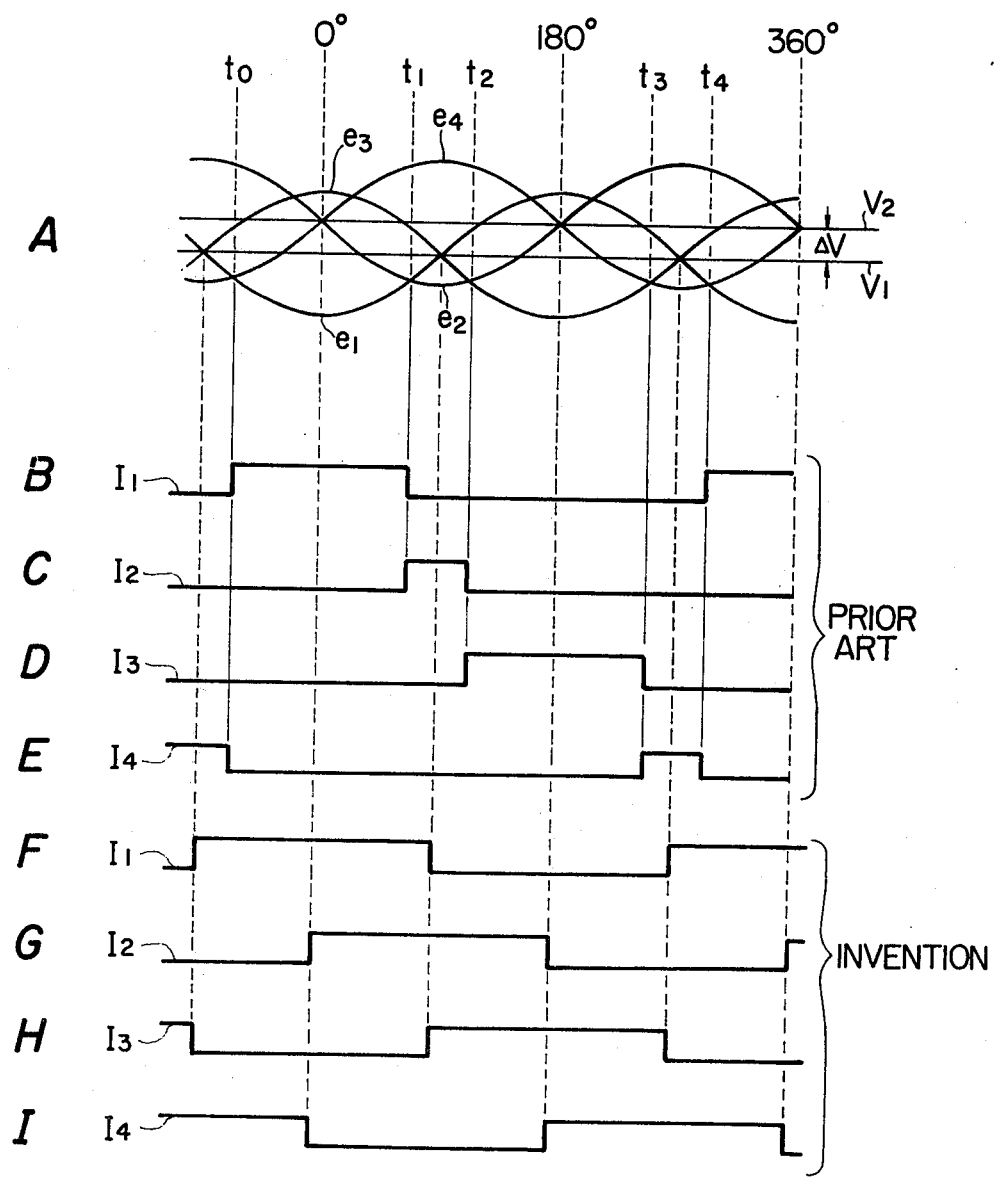
FIGS. 5A and 5I are illustration of the waveforms appearing in the circuit of FIGS. 2 to 4.

With the arrangement of FIG. 1, Hall voltages $e_1$, $e_2$, $e_3$ and $e_4$ are generated at the voltage electrodes of each Hall-effect generator as illustrated in FIG. 5A, with the voltages $e_1$ and $e_3$ being 180° displaced from each other and the voltages $e_2$ and $e_4$ being likewise displaced from each other. The voltage $e_1$ has a maximum negative amplitude when the rotor angle is zero degree with respect to the reference point while the voltage $e_2$ has its maximum negative value at a point 90° displaced from the reference point. With the circuits arranged in the prior art configuration illustrated in FIG. 2, the transistors X1 to X4 form a single differential amplifier. In operation, each of these transistors initiates conduction whenever the base electrode of any one of these transistors is biased at the most negative potential with respect to the emitter potentials of the other switching transistors.

However, due to the nonuniform operating properties of the Hall-effect generators, the Hall-effect generators 2 and 3 may have different DC voltage components $V_1$ and $V_2$, respectively, with a voltage difference $\Delta V$ therebetween, as illustrated in FIG. 5A. Under there circumstances, the alternating voltages $e_1$ and $e_3$ fluctuate about $V_1$, whereas the voltages $e_2$ and $e_4$ fluctuate about $V_2$ with the result that during a time interval from $t_0$ to $t_1$ the voltage $e_1$ is most negative causing transistor X1 to be turned on, and during interval $t_1$ to $t_2$ the voltage $e_2$ is most negative causing transistor X2 to be conductive. Thus, windings W1 and W2 are commutated for different time intervals. Similar situations occur for windings W3 and W4 (see FIGS. 5B to 5E) so that the amount of torque the motor can deliver varies as a function of time. Although such nonuniform commutation intervals can be reduced to a certain degree by adjusting the variable resistor VR, it is difficult to maintain uniformity regardless of temperature variation at all times. Furthermore, it will be observed that the prior art operating circuit encounters a loss of torque at the instant commutation changes from one winding to another since only one of the switching transistors X1 through X4 is allowed to be switched into conduction at a given instant of time.

Figure 3:
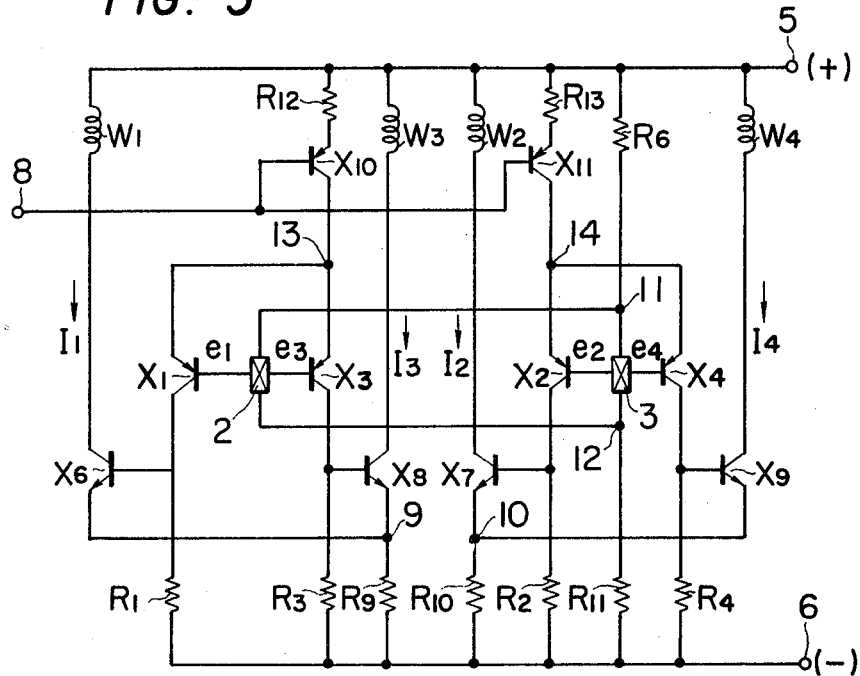
FIG. 3 is a circuit diagram of the control circuit according to the invention.

Referring now to FIG. 3, a motor operating circuit according to the invention is shown in which similar parts to those shown in the previous drawings are indicated by similar numerals used therein. In FIG. 3, the emitters of transistors X1 and X3 are connected together at junction 13 to form a first differential amplifier and the emitters of the transistors X2 and X4 are connected together at a junction 14 to form a second differential amplifier. The junction 13 of the first differential amplifier is connected to the collector of a first current control transistor X10 and the junction 14 of the second differential amplifier is connected to the collector of a second current control transistor X11. The base electrodes of the current control transistors X10 and X11 are connected together to the control terminal 8. The emitters of power transistors X6 and X8 are connected together at junction 9 and thence to the negative terminal 6 via resistor R9 and the emitters of the power transistors X7 and X9 are likewise connected at junction 10 and thence to the negative terminal 6 via resistor R10. The current supply electrodes of both Hall-effect generators are connected in parallel at junctions 11 and 12, the latter being connected to the negative terminal 6 via resistor R11, eliminating the previously employed variable resistor VR. With this circuit configuration, transistors X1 and X3 are rendered conductive solely in response to the Hall voltages applied to their base electrodes with respect to the potential at the junction 13, while transistors X2 and X4 are rendered conductive solely in response to the Hall voltages applied to their base electrodes with respect to the potential at the junction 14. Therefore, transistor X1 is turned on at the instant the voltage $e_1$ falls below the DC potential component $V_1$ which develops at the junction 13 and switched off at the instant it rises above $V_1$ so that current I1 initiates at the instant 90° prior to the instant of 0° and terminates at the instant 90° after the 0° instant. As a result the duration of current I1 is determined solely by the relative voltage of $e_1$ to DC voltage $V_1$, as illustrated in FIG. 5F. Similarly, transistor X2 is rendered conductive at the instant voltage $e_2$ falls below the DC potential $V_2$ (which occurs at the zero degree point) and switched off at the instant it rises above that threshold (which occurs at the 180° point), thus resulting in a current flow I2 which exists while rotor 1 turns from 0° to 180°, as shown in FIG. 5G. Furthermore, it is observed that currents I1 and I2 partially overlap for an interval from 0° to 90°, and likewise currents I2 and I3 overlap for an interval from 90° to 180°. Since voltages $e_1$ and $e_3$ are of identical waveshape of opposite polarities with respect to the DC component $V_1$, the currents I1 and I3, and hence stator windings W1 and W3 are commutated for equal duration. By the same reasoning, currents I2 and I4, hence the stator windings W2 and W4 are commutated for equal duration.

Although the amplitude of the alternating voltages $e_1$ to $e_4$ may vary between them due to the different operating characteristics of the individual Hall-effect generators, the crossover point of each alternating voltage waveform on the respective DC potential level is invariable, so that the windings W1 to W4 are energized exactly for the same duration, as clearly illustrated in FIGS. 5F to 5I. It will be noted that in accordance with the invention the presence of any fluctuation of voltage difference $\Delta V$ will not result in a variation of current conduction periods, which would otherwise occur in the prior art circuit.

Figure 4:
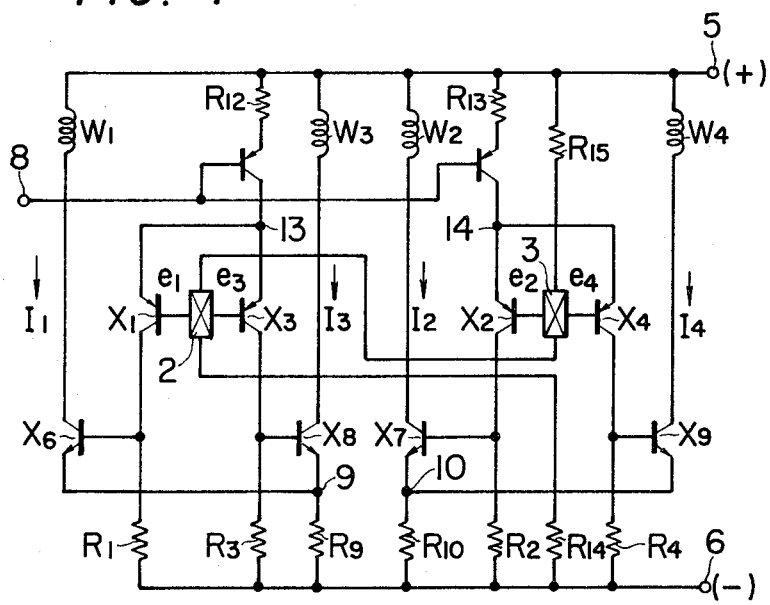
FIG. 4 is a modification of the circuit of FIG. 3.

FIG. 4 is a modification of the previous embodiment which differs from the latter in that the current supply electrodes of the Hall-effect generators 2 and 3 are connected in a series circuit so that both Hall-effect generators are fed with the same current via resistors R15 and R14, instead of having them connected in a parallel circuit as in the previous embodiment. The series circuit configuration reduces the amount of current required to effect generation of Hall voltages to one-half of the amount of current needed in the previous embodiment.

If the DC motor of the present invention is used in a record player, approximately a 50% of the total current drain would be lost for useless purposes. Therefore, for such applications, the reduction of Hall generator currents is at a premium in terms of power efficiency.

What is claimed is:

1. A multiphase brushless DC motor including a permanent magnet rotor; first, second, third and fourth mutually electrically displaced stator windings; first and second Hall-effect generators associated with the stator windings having a pair of first and second Hall voltage electrodes and a pair of current supply electrodes through which current is supplied to effect generation of a Hall voltage at said Hall voltage electrodes in response to variations in magnetic field intensity due to the revolution of said rotor, said first and second Hall-effect generators being connected, in use, in a series circuit through said current supply electrodes between first and second terminals of voltage source; first, second, third and fourth switching transistors having their base electrodes respectively connected to the Hall-voltage electrodes of said Hall-effect generators to be responsive to the potential difference between the respective base and emitter electrodes; first, second, third and fourth power transistors of opposite conductivity type to that of said switching transistors for successively energizing said first, second, third and fourth windings respectively in response to the conduction of said first, second, third and fourth switching transistors; and means for supplying a current to said first, second, third and fourth switching transistors in response to a control signal so as to control the currents supplied to said windings, said first and third switching transistors having their emitters connected together to define a first differential amplifier and said second and fourth transistors having their emitters connected together to define a second differential amplifier; said control current supplying means comprising a first and a second current control transistor of the same conductivity type as that of said switching transistors, said first current control transistor being connected in a series circuit with said first and third switching transistors, and said second current control transistor being connected in a series circuit with said second and fourth switching transistors, the base electrodes of said current control transistors being connected to be responsive to said control signal to respectively regulate the currents supplied to said differential amplifiers.

2. A multiphase brushless DC motor as claimed in claim 1, wherein said first and third power transistors have their emitters connected together and said second and fourth power transistors have their emitters connected together.

* * * * *